US012196906B2

(12) United States Patent
Aldawood et al.

(10) Patent No.: US 12,196,906 B2
(45) Date of Patent: Jan. 14, 2025

(54) WHILE DRILLING SINGLE WELL SEISMIC PROFILING ACQUISITION SYSTEM USING DRILL BIT SEISMIC DATA

(71) Applicant: SAUDI ARABIAN OIL COMPANY, Dhahran (SA)

(72) Inventors: Ali Aldawood, Safwa (SA); Mohammed Almarzoug, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 34 days.

(21) Appl. No.: 18/046,821

(22) Filed: Oct. 14, 2022

(65) Prior Publication Data

US 2024/0125964 A1    Apr. 18, 2024

(51) Int. Cl.
| | |
|---|---|
| E21B 47/12 | (2012.01) |
| E21B 49/00 | (2006.01) |
| G01V 1/22 | (2006.01) |
| G01V 1/46 | (2006.01) |
| G01V 1/52 | (2006.01) |

(52) U.S. Cl.
CPC ............. *G01V 1/46* (2013.01); *E21B 47/12* (2013.01); *E21B 49/003* (2013.01); *G01V 1/226* (2013.01); *G01V 2001/526* (2013.01); *G01V 2210/1216* (2013.01); *G01V 2210/6222* (2013.01)

(58) Field of Classification Search
CPC ......... E21B 47/12; E21B 49/003; G01V 1/46; G01V 1/226; G01V 2001/526; G01V 2210/1216; G01V 2210/6222
See application file for complete search history.

(56) References Cited

U.S. PATENT DOCUMENTS

| | | | |
|---|---|---|---|
| 5,012,453 A | 4/1991 | Katz | |
| 8,800,685 B2 | 8/2014 | Coman et al. | |
| 10,018,749 B2 | 7/2018 | Cooper | |
| 2010/0200743 A1 | 8/2010 | Forster et al. | |
| 2012/0092960 A1* | 4/2012 | Gaston ................... | G01V 1/226 367/35 |

(Continued)

OTHER PUBLICATIONS

Aldawood, Ali et al., "Imaging ahead of and around the bit in a desert environment: DrillCAM field trial with wireless geophones and top-drive sensor"; The Leading Edge; vol. 40, Issue 5; pp. 374-381; May 2021 (8 pages).

(Continued)

*Primary Examiner* — Taras P Bemko
(74) *Attorney, Agent, or Firm* — Osha Bergman Watanabe & Burton LLP (57) ABSTRACT

A method includes drilling a wellbore into a subsurface using a drill bit and, for each of a plurality of depths of the drill bit in the wellbore, detecting, at each of a plurality of receiver stations located along a fiber optic cable disposed behind a casing string within the wellbore, a seismic signal created by the drill bit drilling the wellbore, sending an optical signal generated by the detection of the seismic signal from each of the plurality of receiver stations to an interrogator, sorting, using a computer processor, the optical signals by receiver station, and determining, using the computer processor, a seismic velocity using first breaks picked from the sorted optical signals.

19 Claims, 8 Drawing Sheets

(56) References Cited

U.S. PATENT DOCUMENTS

| | | | |
|---|---|---|---|
| 2015/0233236 A1* | 8/2015 | Johnston | G01V 1/226 |
| | | | 73/152.16 |
| 2018/0045559 A1* | 2/2018 | Hawthorn | G01V 1/16 |
| 2020/0116883 A1* | 4/2020 | Padhi | G01V 1/305 |
| 2020/0271809 A1* | 8/2020 | Al-Ali | G01V 1/50 |
| 2020/0271811 A1* | 8/2020 | Wilson | G01V 1/52 |
| 2021/0132247 A1* | 5/2021 | Mukhtarov | G01V 1/226 |
| 2021/0156734 A1* | 5/2021 | Johnston | G01V 1/44 |
| 2022/0196861 A1* | 6/2022 | Pattnaik | G01V 1/364 |
| 2022/0244418 A1* | 8/2022 | Davies | E21B 49/00 |

OTHER PUBLICATIONS

Almarzoug, M. et al., "Improving Signal-To-Noise Ratio of Distributed Acoustic Sensing Data via Super-Virtual Refraction Interferometry"; Proceedings of the 81st EAGE Conference and Exhibition 2019; vol. 2019; pp. 1-5; Jun. 2019 (5 pages).

Bakulin, Andrey et al., "Seismic-while-drilling applications from the first DrillCAM trial with wireless geophones and Instrumented top drive"; The Leading Edge; vol. 39, Issue 6; pp. 422-429; Jun. 2020 (8 pages).

Bakulin, Andrey et al., "Smart DAS upholes for simultaneous land near-surface characterization and subsurface imaging"; The Leading Edge; vol. 36, Issue 12; pp. 1001-1008; Dec. 2017 (8 pages).

Rector, J. W., III et al., "The use of drill-bit energy as a downhole seismic source"; Geophysics; vol. 56, Issue 5; pp. 628-634; May 1991 (7 pages).

Jaksch, Katrin et al., "Seismic Prediction While Drilling (SPWD): Looking Ahead of the Drill Bit by Application of Phased Array Technology"; Scientific Drilling; vol. 9; pp. 41-44; Apr. 2010 (4 pages).

Poletto, F. B. et al., "Seismic While Drilling: Fundamentals of Rill-Bit Seismic for Exploration"; Handbook of Geophysical Exploration: Seismic Exploration; vol. 35; Chapter 3: General theory: drill-bit seismic waves; pp. 93-162; 1st Edition—Jun. 30, 2004 (70 pages).

Poletto, F. B. et al., "Seismic While Drilling: Fundamentals of Rill-Bit Seismic for Exploration"; Handbook of Geophysical Exploration: Seismic Exploration; vol. 35; Chapter 4: General theory: drill-string waves and noise fields; pp. 163-212; 1st Edition—Jun. 30, 2004 (50 pages).

Poletto, F. B. et al., "Seismic While Drilling: Fundamentals of Rill-Bit Seismic for Exploration"; Handbook of Geophysical Exploration: Seismic Exploration; vol. 35; Chapter 5: Acquisition of SWD data; pp. 213-289; 1st Edition—Jun. 30, 2004 (77 pages).

Poletto, F. B. et al., "Seismic While Drilling: Fundamentals of Rill-Bit Seismic for Exploration"; Handbook of Geophysical Exploration: Seismic Exploration; vol. 35; Chapter 6: Preprocessing of SWD data; pp. 291-343; 1st Edition—Jun. 30, 2004 (53 pages).

Poletto, F. B. et al., "Seismic While Drilling: Fundamentals of Rill-Bit Seismic for Exploration"; Handbook of Geophysical Exploration: Seismic Exploration; vol. 35; Chapter 7: Processing of signal and noise RVSP fields; pp. 345-392; 1st Edition—Jun. 30, 2004 (48 pages).

Poletto, F. B. et al., "Seismic While Drilling: Fundamentals of Rill-Bit Seismic for Exploration"; Handbook of Geophysical Exploration: Seismic Exploration; vol. 35; Chapter 8: Applications; pp. 393-468; 1st Edition—Jun. 30, 2004 (76 pages).

* cited by examiner

WHILE DRILLING SINGLE WELL SEISMIC PROFILING ACQUISITION SYSTEM USING DRILL BIT SEISMIC DATA

BACKGROUND

In the oil and gas industry, wells are drilled into the surface of the Earth to access and produce hydrocarbons located in hydrocarbon reservoirs. The locations of hydrocarbon reservoirs are often determined by performing seismic surveys. Seismic surveys are used to image the subsurface and these images may be analyzed when looking for hydrocarbon reservoirs. Seismic surveys gather seismic data using a source that emits seismic waves and a receiver that receives a reflection of the seismic waves from the subsurface. The seismic data is processed to form the image of the subsurface. Conventional methods of seismic acquisition require significant processing and are contaminated with noise due to the location of the sources and the receivers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and drilling systems for seismic acquisition. The method includes drilling a wellbore into a subsurface using a drill bit and, for each of a plurality of depths of the drill bit in the wellbore, detecting, at each of a plurality of receiver stations located along a fiber optic cable disposed behind a casing string within the wellbore, a seismic signal created by the drill bit drilling the wellbore, sending an optical signal generated by the detection of the seismic signal from each of the plurality of receiver stations to an interrogator, sorting, using a computer processor, the optical signals by receiver station, and determining, using the computer processor, a seismic velocity using first breaks picked from the sorted optical signals.

The drilling system includes a casing string, a drill string, a fiber optic cable, an interrogator, and a computer processor. The casing string is cemented into a wellbore. The drill string has a drill bit disposed within the casing string. The drill bit is configured to drill the wellbore to extend a depth of the wellbore. A plurality of seismic signals are created due to drilling the wellbore. The fiber optic cable has a plurality of receiver stations and is cemented behind the casing string. The plurality of receiver stations receive the plurality of seismic signals and create a plurality of optical signals due to reception of the plurality of seismic signals. The interrogator is connected to a surface-extending portion of the fiber optic cable. The computer processor is configured to sort the plurality of optical signals by each receiver station and by depth of the drill bit and determine a plurality of seismic velocities using first breaks picked from the sorted optical signals.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-11, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "an seismic signal" includes reference to one or more of such seismic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Figure 1:
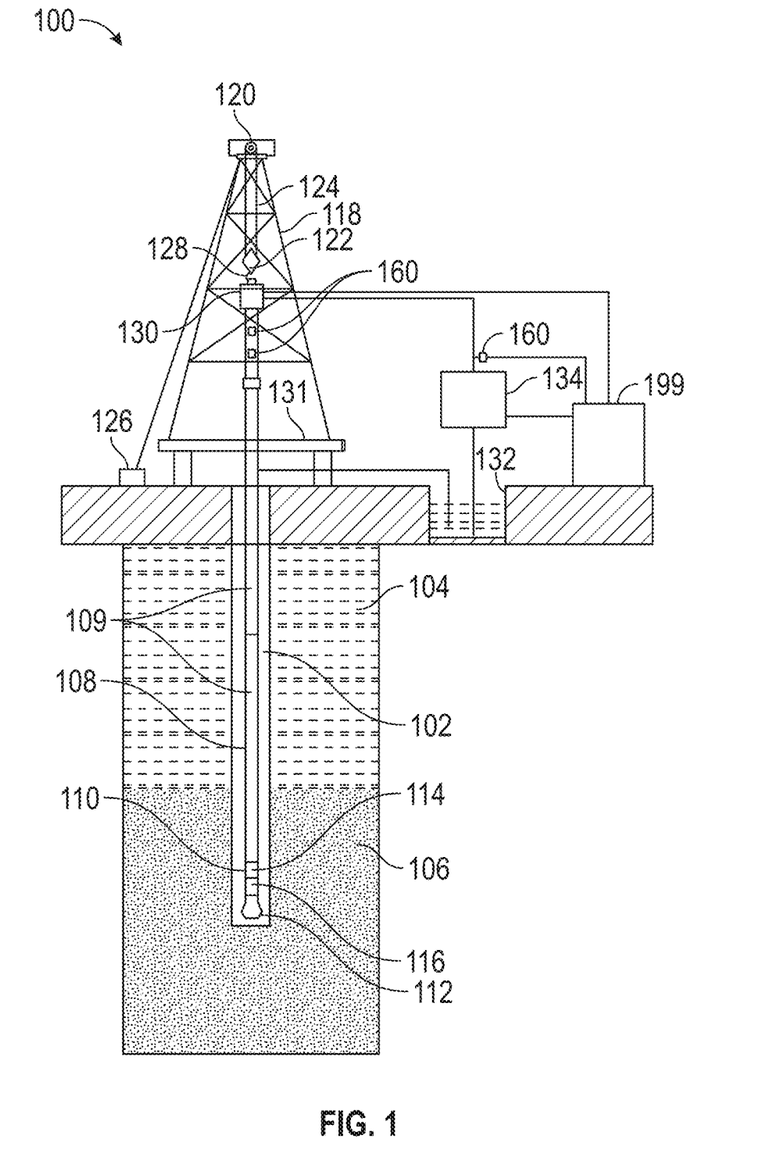
FIG. 1 shows an example of a well site in accordance with one or more embodiments.

FIG. 1 shows an example well site (100) in accordance with one or more embodiments. In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. Herein, the term surface is defined as any location located outside of the wellbore (102), such as somewhere on the Earth's surface, on a man-made object located on the Earth's surface, etc. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (199) may be disposed at or communicate with the well site (100). System (199) may control at least a portion of a drilling operation at the well site (100) by providing controls to various components of the drilling operation. In one or more embodiments, system (199) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (199).

In conventional reverse vertical seismic profiling, the sources and the receivers are often located at a large offset from one another, thus, the signals must travel a large distance to be received by the receiver. This travel distance attenuates the signal and makes it more susceptible to contamination with noise, leading to inaccurate readings of the seismic data.

Specifically, the signal from the source upward to the receiver at the surface suffers from high seismic attenuation and must go through the complex section of near-surface geology. Further, vibrations caused by rig operations such as vehicles, generators, mud pumps, and shale shakers, and other equipment introduces strong seismic noise to the acquired data.

As such, embodiments disclosed herein, presenting a seismic acquisition system for single well profiling that uses the drill bit (112) as a source and uses a fiber optic cable, cemented downhole behind a casing string, as the receiver, represent an improvement over conventional methods. With both the source and the receiver located downhole, the signals emitted by the drill bit (112) are cleaner when received by the receiver.

Specifically, the recorded signal may suffer from less attenuation and scattering that may be caused by complex near-surface geological structures. Clean data aids in producing a high-resolution velocity profile for the well. Specifically, single well profile data obtained this way can provide first-break records in one-way travel time (OWT), which is what yields the high-resolution velocity profile of the well.

Figure 2:
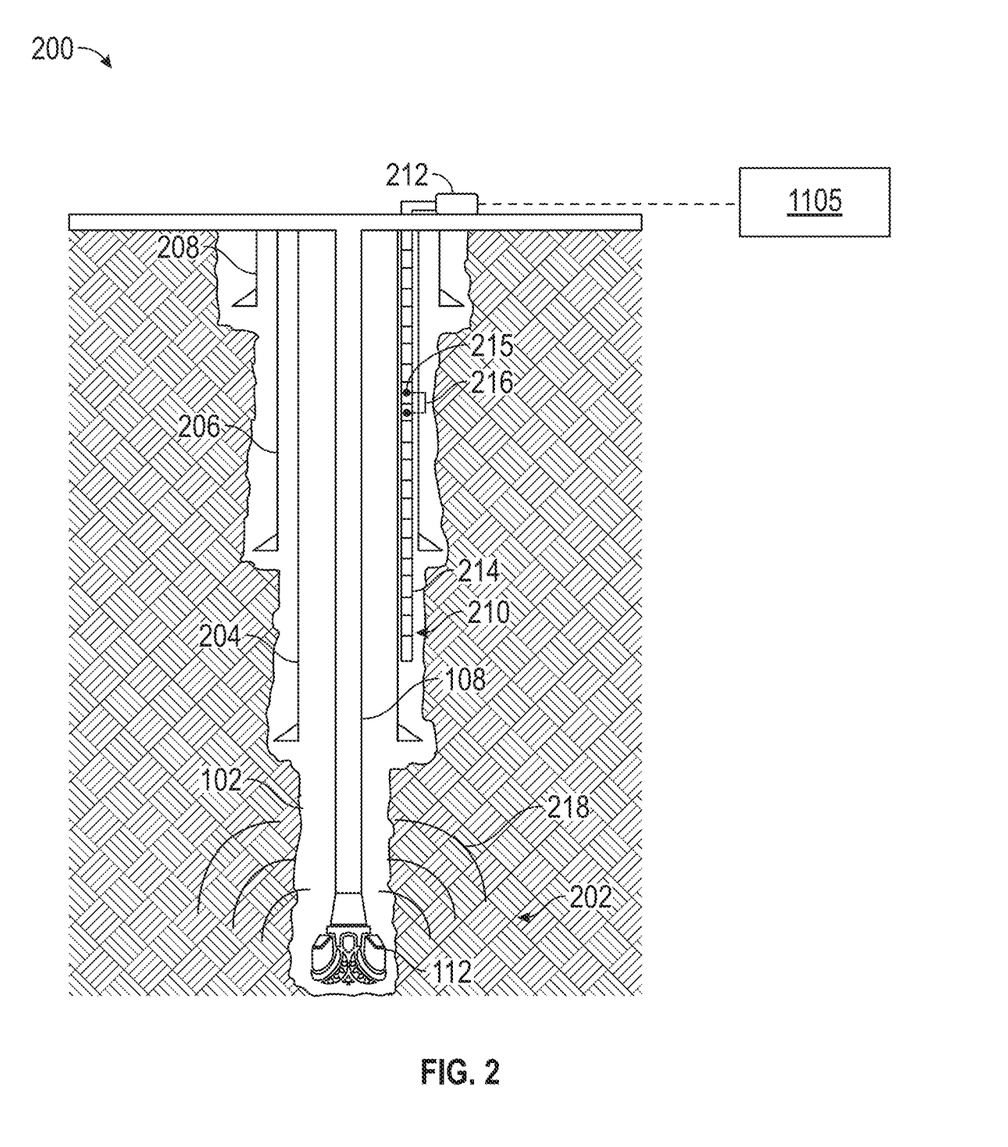
FIG. 2 shows a system in accordance with one or more embodiments.

FIG. 2 shows a seismic acquisition system that includes a well (200) drilled into a subsurface (202) in accordance with one or more embodiments. The well (200) may be located at a well site, such as well site (100) shown in FIG. 1. Components in FIG. 2 that are similar to or the same as components shown in FIG. 1 have not been redescribed for purposes of readability and have the same structure and description as outlined above. The well (200) includes one or more casing strings cemented in the well (200). Further, the well (200) may have any well design known in the art without departing from the scope of the disclosure herein.

For purposes of example only, the well (200) has three casing strings: a first casing string (204), a second casing string (206), and a third casing string (208). The three casing strings are concentric, meaning they are located within one another. The first casing string (204) is the innermost casing string and is also the deepest set casing string. The third casing string (208) is the outermost casing string and is also the shallowest set casing string. The second casing string (206) is located between the first casing string (204) and the third casing string (208).

The three casing strings are made of a plurality of tubulars connected axially to one another that extend into a wellbore (102) drilled into the subsurface (202). The wellbore (102) is a hole drilled into the subsurface (202). The subsurface (202) may include a plurality of different formations (104, 106). The casing strings may be made out of any durable material known in the art, such as steel. Further, each casing string may be made of solid tubulars, slotted tubulars, or a mixture of both.

Each casing string may be partially or completely cemented in place. The cement is located in the annulus created between each casing string and a wall of the wellbore (102) and/or in the annuli located between two concentric casing strings. The wellbore (102) may have different diameters. For example, the portion of the wellbore (102) within which the third casing string (208) is cemented may be a larger diameter than the portion of the wellbore (102) within which the first casing string (204) is cemented.

In some embodiments, a fiber optic cable (210) may be located behind the first casing string (204). In other words, the fiber optic cable (210) may be located in the space between the first casing string (204) and the second casing string (206). The depth of the fiber optic cable (210) may also extend past the depth of the second casing string (206) and into the wellbore (102) as shown in FIG. 1. In further embodiments, the fiber optic cable (210) is cemented in place behind the first casing string (204).

In other embodiments, the fiber optic cable (210) may be located behind any of the casing strings, however, placing the fiber optic cable (210) behind the innermost casing string allows the fiber optic cable (210) to be deeper and be closer to the drill bit (112). The fiber optic cable (210) has a laser beam, not pictured, streaming within the fiber optic cable (210). The surface-extending portion of the fiber optic cable (210) is connected to an interrogator (212) located on the surface. The interrogator (212) may be the source of the laser beam.

The interrogator (212) may also be known as a measurement unit or a data acquisition system. The interrogator (212) is an optoelectronic instrument that reads signals scattered back from within the fiber optic cable (210). In further embodiments, the interrogator (212) may be connected, wirelessly or wired, to a computer processor (1105). The computer processor (1105) may be located within the interrogator (212) without departing from the scope of the disclosure herein. The computer processor (1105) may be part of a computer (1102) system further outlined in FIG. 11.

The fiber optic cable (210) may be divided into a plurality of receiver stations (214). A single receiver station (214) may be defined by a gauge length of the fiber optic cable (210). The gauge length is the length of the fiber optic cable (210) at which the signal is averaged over. Each receiver station has a center (215). The center (215) is the geometric center of the gauge length of the receiver station (214). The distance between the centers (215) of two neighboring receiver stations (214) determines a receiver spacing (216).

The gauge length is based, at least in part, on an anticipated velocity profile. Specifically, the optimal gauge length may be based on the dominant spatial wavelength which is determined by dividing the average velocity by the dominant frequency. In order to maximize the signal to noise ratio, it is preferred that the ratio between the gauge length and the wavelength of interest is between 0.5 and 0.8.

For example, each receiver station (214) may be a gauge length of 33 feet (10 meters) of the fiber optic cable (210), thus, the receiver spacing (216) is also 33 feet (10 meters). The gauge length of each receiver station (214), the receiver spacing (216), and each receiver's location along the fiber optic cable (210) may be set and controlled by the computer processor (1105) through the interrogator (212).

A drill string (108) having a drill bit (112) may be disposed in the well (200). The drill string (108) and the drill bit (112) may have any configuration and design known in the art without departing from the scope of the disclosure herein. The purpose of drill bit (112) is to drill the wellbore (102), i.e., the drill bit (112) to extend the depth of the wellbore (102) by breaking up rock located at the end ("toe") of the wellbore (102). A side-effect of drilling may be the emission of a plurality of seismic signals (218) caused by vibrations of the drill bit (112) and the breaking of rock.

The plurality of seismic signals (218) propagate through the subsurface and are received at the plurality of receiver stations (214) of the fiber optic cable (210). The reception of the plurality of seismic signals (218) at the plurality of receiver stations (214) causes a plurality of optical signals, not pictured, to be created and sent along the fiber optic cable (210) to the interrogator (212).

Specifically, when the propagation of seismic waves (i.e., the seismic signals) interact with the fiber optic cable (210), a strain is created in the fiber optic cable (210). The strain causes temporal variations in the backscatter of the laser beam streaming inside the fiber optic cable (210). The temporally varying backscattered laser beam travels back to the interrogator (212) where it may be decoded and recorded. In accordance with one or more embodiments, the plurality of optical signals is the backscattered laser beam.

Figure 3:
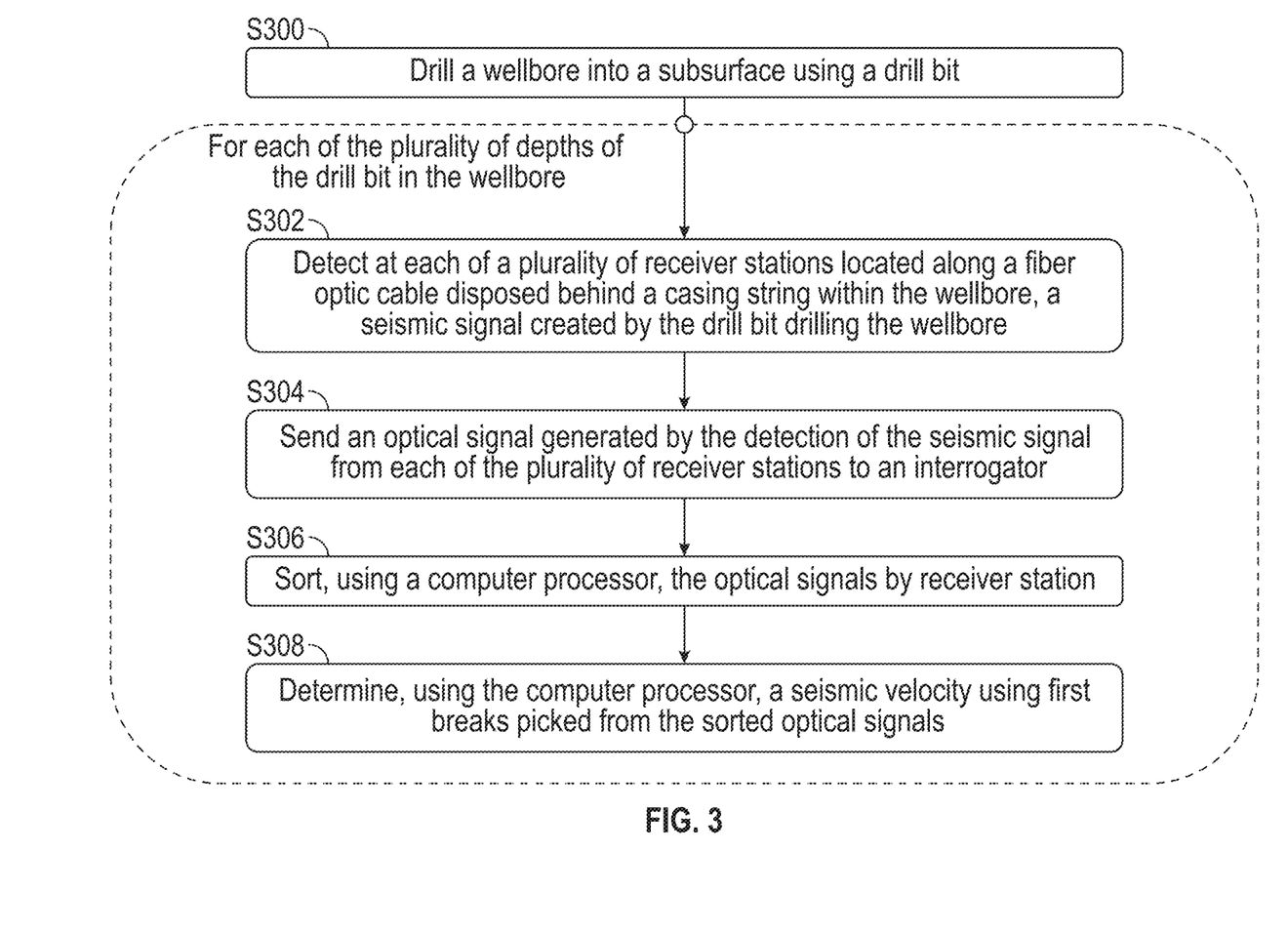
FIG. 3 shows a flowchart in accordance with one or more embodiments.

In further embodiments, a sensor may be installed on the top drive (130) to record the drill bit (112) signatures vibrating through the drill string (108). The data from this sensor may be used to deconvolve the drill bit (112) noise and collapse the noise into a that might be recorded from an impulse-like signal. This process may be performed by using the top drive (130) pilot signal as a deconvolution operator and applying a time shift that correspond to the vibrations time delays between the top drive (130) location and the subsurface drill bit (112) location FIG. 3 shows a flowchart in accordance with one or more embodiments. The flowchart outlines a method for using a seismic acquisition system to create a single well profile of a subsurface geometry. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a wellbore (102) is drilled into a subsurface using a drill bit (112) (S300). The wellbore (102) is part of a well (200), such as the well (200) outlined in FIG. 2. In accordance with one or more embodiments, the first casing string (204) is cemented in the wellbore (102). The drill bit (112) is deployed in the well (200) using a drill string (108), and the drill bit (112) is extending the wellbore (102) to a depth deeper than the first casing string (204). A fiber optic cable (210) having a plurality of receiver stations (214) separated by receiver spacing (216) is disposed behind the first casing string (204). The fiber optic cable (210) is connected to an interrogator (212) located at the surface.

For each of the plurality of depths, a seismic signal (218) created by the drill bit drilling the wellbore is detected at each of a plurality of receiver stations (214) located along a fiber optic cable (210) disposed behind a casing string within the wellbore (102) (S302). In accordance with one or more embodiments, the seismic signals (218) are a propagation of seismic waves caused by the drill bit (112) drilling the wellbore (102). A strain caused by the propagation of seismic waves is sensed when the propagation of seismic waves interact with the fiber optic cable (210). The strain causes a backscattered laser beam to be generated.

Specifically, a laser beam is streaming within the fiber optic cable (210) and the propagation of seismic waves cause the laser beam to backscatter and travel back to the interrogator (212). In accordance with one or more embodiments, the plurality of optical signals are the backscattered laser beams, and the backscattered laser beams are propagated along the fiber optic cable (210). As such, and for each of the plurality of depths, an optical signal, generated by the detection of the seismic signal from each of the plurality of receiver stations (214), is sent to an interrogator (212) (S304). In accordance with one or more embodiments, the interrogator (212) is located outside of the subsurface.

In further embodiments, the interrogator (212) is able to collect the plurality of optical signals to provide real time seismic measurements that may be processed immediately for drilling applications such as ahead-of-bit prediction. Ahead-of-bit prediction may be used to estimate the depth of an upcoming geological formation (104, 106) to identify possible high-pressure zones and adjust the drilling plan accordingly.

Another application is check shot while drilling which is used to establish a time-depth curve for calibration of previously generated seismic images to locate the approximate location of the drill bit (112) on such images. Being able to record high-frequency signals, which is not present in conventional seismic acquisition data sets, ensures accurate velocity information generation.

The plurality of optical signals are preprocessed using data obtained from the top drive (130) sensor. This preprocessing step removes the drill string (108) response from the data. For each of the plurality of depths, the optical signals are sorted by receiver station (S306) using the computer processor (1105). In accordance with one or more embodiments, the plurality of optical signals are sorted using either a common shot gather (CSG) sorting domain or a common receiver gather (CRG) sorting domain. The optical signals may be sorted by determining a sum of the optical signals generated by each of the plurality of seismic signals (218) at each receiver station (214).

Figure 4:
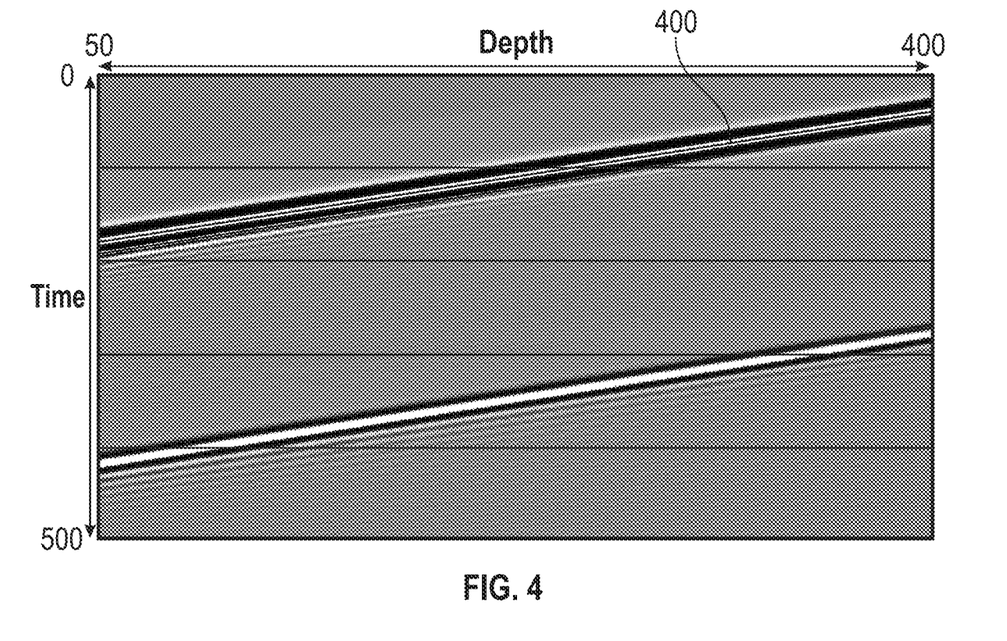
FIG. 4 shows an example of a common-shot gather (CSG) in accordance with one or more embodiments.

FIG. 4 shows an example of a CSG sorting domain in accordance with one or more embodiments. The CSG domain sorts the plurality of optical signals for each shot (i.e., drill bit (112) depth) individually. FIG. 4 displays the plurality of optical signals created by the reception of the plurality of seismic signals sent from a single drill bit (112) depth at all of the receiver stations (214). The horizontal axis indicates the depth of the receiver stations (214), and the vertical axis indicates the travel time. The plotted line corresponds to first break picks (400).

The plurality of optical signals may be stacked to enhance a signal-to-noise ratio using the computer processor (1105). In the present disclosure, the plurality of optical signals may be recorded by the interrogator (212) and the computer processor (1105) in a continuous manner at every depth level. Thus, stacking the plurality of optical signals removes the incoherent events to improve the signal to noise ratio.

Figure 5:
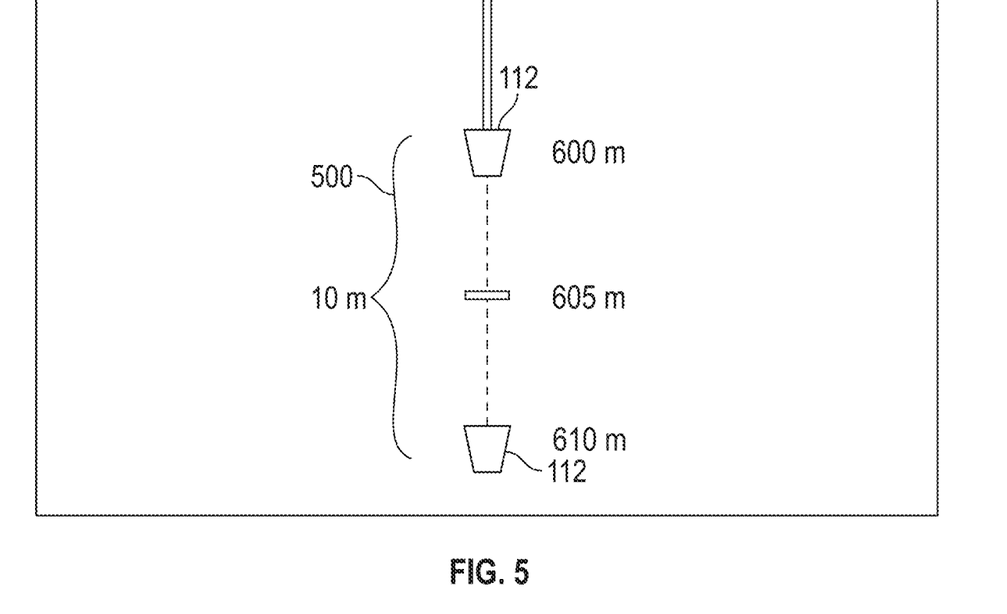
FIG. 5 shows an example on an interval used for stacking the plurality of optical signals in accordance with one or more embodiments.

FIG. 5 shows an example on an interval (500) used for stacking the plurality of optical signals in accordance with one or more embodiments. FIG. 5 shows the drill bit (112) at two different depths: 600 meters and 610 meters. Thus, the interval (500) is 10 meters. The plurality of optical signals gathered during that interval (500) is stacked and the signal is placed at the middle of the interval (500) which, in this example, is 605 meters. This stacking process may be repeated for each interval (500) available.

Figure 6:
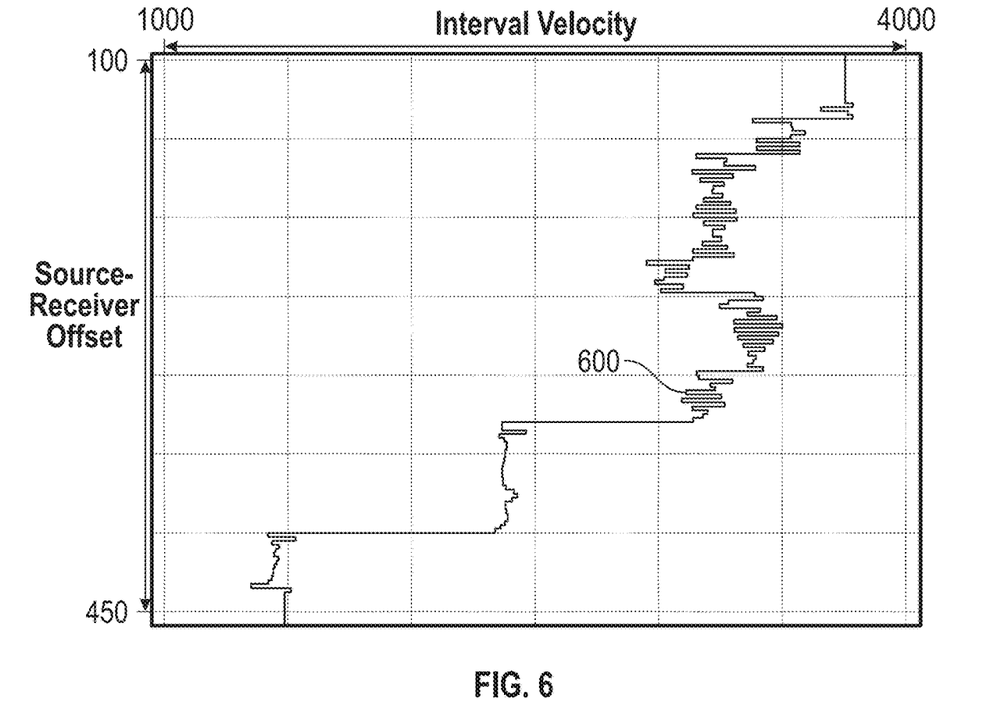
FIG. 6 shows an example 1D velocity profile in accordance with one or more embodiments.

For each of the plurality of depths, a seismic velocity is generated using first breaks picked from the sorted optical signals and using the computer processor (1105) (S308). The seismic velocity is used to generate a 1D velocity profile (600). Further, an uncertainty estimate of the 1D velocity profile (600) may be generated. The uncertainty estimate may be based, at least in part, on a statistical analysis of the 1D velocity profile (600). The statistical analysis of the 1D velocity profile (600) is performed to compute means and standard deviation of interval velocities.

The statistical analysis is based, in part, on the realization of each drill bit (112) depth. Each drill bit (112) depth is a realization that yields a velocity profile (600) by the signals propagating through the subsurface. Theoretically, the velocity profile (600) should be the same for each drill bit (112) realization given they are sampling the same subsurface. However, due to measurement errors, the velocity profiles (600) tend to differ from one another. Thus, the statistical analysis is performed on the velocity profiles (600) to extract the mean and standard deviation of the velocity profiles (600).

FIG. 6 shows an example 1D velocity profile (600) in accordance with one or more embodiments. The horizontal axis represents the interval (500) velocity, and the vertical axis represents the source to receiver offset (i.e., the offset between the depth of the drill bit (112) when the plurality of seismic signals (218) were received by the receiver stations (214) and the depth of the receiver stations (214)). The 1D velocity profile (600) represents the vertical variations of velocity with depth.

Figure 7:
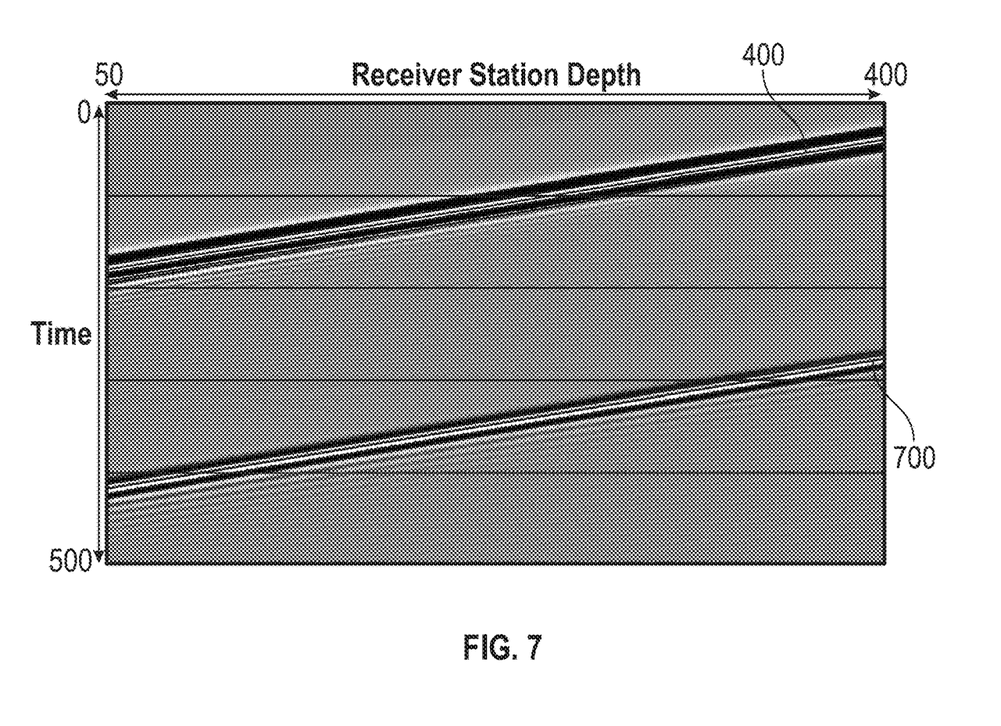
FIG. 7 displays the plurality of optical signals created by the reception of the plurality of seismic signals at all of the receiver stations in accordance with one or more embodiments.

In further embodiments, the plurality of seismic signals (218) have direct arrivals and reflections (700) (also known as scattered waves), thus, the optical signals corresponding to the seismic signal's (218) direct arrivals and reflections (700) need to be separated for further processing. FIG. 7 displays the plurality of optical signals created by the reception of the plurality of seismic signals (218) at all of the receiver stations (214) in accordance with one or more embodiments. The horizontal axis indicates the depth of the receiver stations (214), and the vertical axis indicates the travel time. The plotted lines correspond to first break picks (400), which correspond to the direct arrivals, and the reflections (700).

Figure 8:
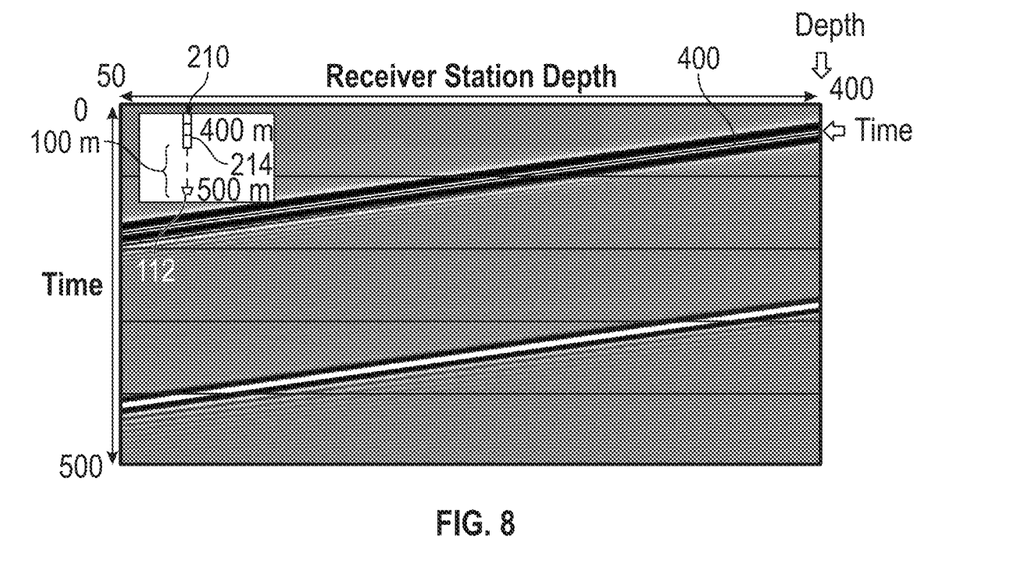
FIG. 8 shows an example of a CSG sorting domain and a velocity calculation for a single interval of drill bit depth in accordance with one or more embodiments.

FIG. 8 shows an example of a CSG sorting domain and a velocity calculation for a single interval (500) of drill bit (112) depth in accordance with one or more embodiments. The horizontal axis indicates the depth of all of the receiver stations (214) on the fiber optic cable (210), and the vertical axis indicates the travel time. The plotted line corresponds to first break picks (400). The distance between the depth of the drill bit (112) and the depth of the deepest receiver station (214) of the fiber optic cable (210) is shown superimposed on the CSG sorting domain.

In the CSG sorting domain, the average velocity is determined by dividing the distance between the depth of the shot (i.e., the drill bit (112)) and the deepest receiver station (214) by the time of the first break pick at the deepest receiver station (214). For the example shown in FIG. 8, the average velocity is the drill bit (112) to deepest receiver station (214) distance of 100 meters divided by 0.04 seconds which results in 2500 meters per second. In the CSG sorting domain, the first break picks (400) and the reflections (700) of the seismic signals (218) are coming from below the receiver station (214) so the first break picks (400) and the reflections (700) cross in parallel.

Figure 9:
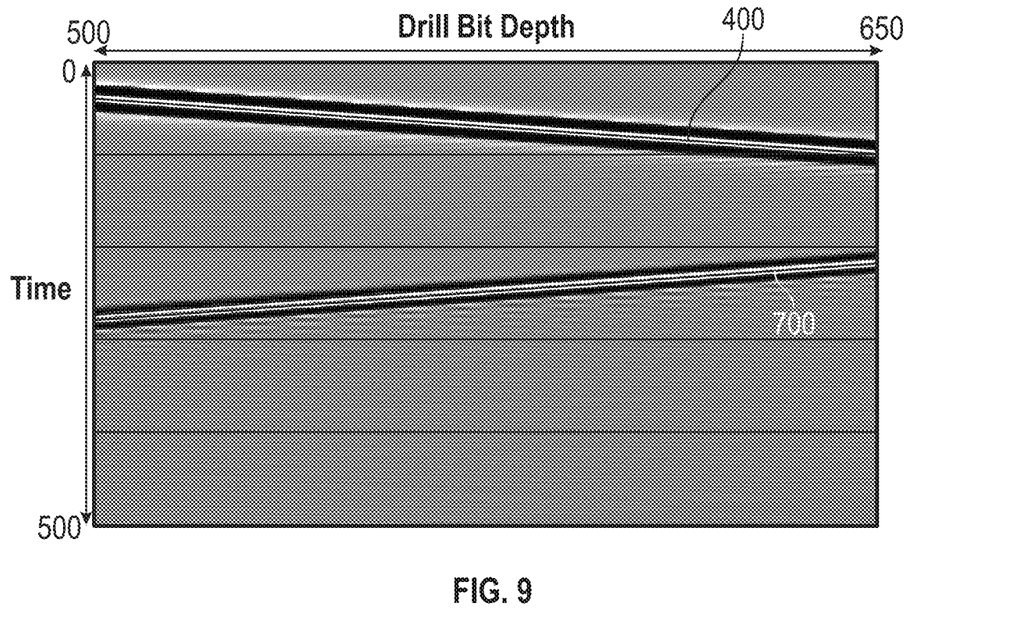
FIG. 9 shows an example of a common receiver gather (CRG) sorting domain in accordance with one or more embodiments.

FIG. 9 shows an example of a CRG sorting domain in accordance with one or more embodiments. In a CRG domain, the optical signals created at a single receiver station (214) from the seismic signals (218) sent at every shot level (i.e., depth of the drill bit (112)) is displayed. The shot depth/drill bit (112) depth is shown on the horizontal axis and the travel time is shown on the vertical axis. The plotted lines correspond to first break picks (400) and the reflections (700). In accordance with one or more embodiments, the slope of the first break picks (400) is used to create the 1D velocity profile (600).

To predict the depth of an upcoming seismic reflector (i.e., a formation (104, 106) boundary), the travel time of the first break picks (400) is subtracted from the reflections (700). This creates the two-way-travel time (TWT) from the drill bit (112) to the reflector and back to the drill bit (112) position. The one-way-travel time (OWT) from the drill bit (112) to the reflector is determined by dividing the TWT by 2. The estimated velocity is then multiplied by the one-way travel time to determine the distance to the reflecting layer from the current drill bit (112) depth. In other words, when the two lines formed by the first break picks (400) and the reflections (700) may be extrapolated to a point where the cross. The point where the two lines cross corresponds to the depth of the reflecting layer.

Figure 10:
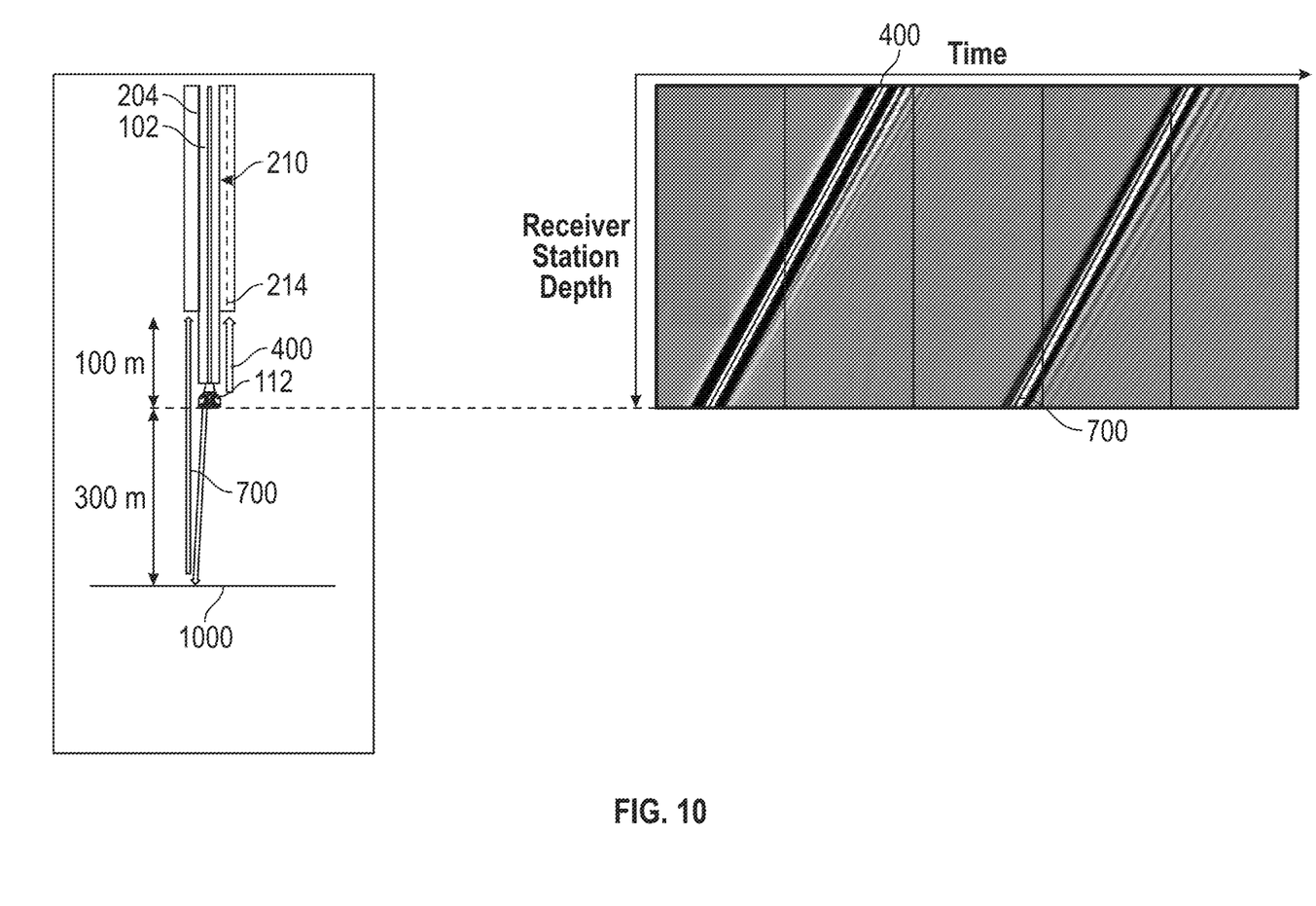
FIG. 10 shows an example of a CSG sorting domain in accordance with one or more embodiments.

FIG. 10 shows an example of a CSG sorting domain in accordance with one or more embodiments. FIG. 10 displays the plurality of optical signals created by the reception of the plurality of seismic signals (218) sent from a single drill bit (112) depth interval (500) at all of the receiver stations (214) on the fiber optic cable (210). The vertical axis indicates the depth of the receiver stations (214), and the horizontal axis indicates the travel time.

The plotted lines correspond to first break picks (400) and the reflections (700). The distance between the depth of the drill bit (112) and the depth of the deepest receiver station (214) of the fiber optic cable (210) is shown next to the CSG sorting domain. A seismic reflector (1000) with an unknown distance is shown ahead of the drill bit (112). FIG. 10 shows a direct seismic signal (1002) coming from the drill bit (112) and a reflected seismic signal (1004) coming from the seismic reflector (1000).

For purposes of example only, the first pick travel time to the deepest receiver station (214) is 40 micro-seconds and the reflected arrival to the deepest receiver station (214) is 280 micro-seconds. The travel time difference is 240 micro-seconds which is equal to the TWT. The TWT is divided by 2 to yield 120 micro-seconds for the OWT.

The estimated velocity is multiplied by the OWT to yield the offset between the seismic reflector (1000) and the drill bit (112) position. The average velocity is 2500 meters per second as determined in FIG. 8. The estimated depth of the upcoming formation (104, 106) is 2500 meters per second multiplied by 0.12 seconds which is equal to 300 meters. Thus, the seismic reflector (1000) is 300 meters ahead of the current drill bit (112) source depth.

Figure 11:
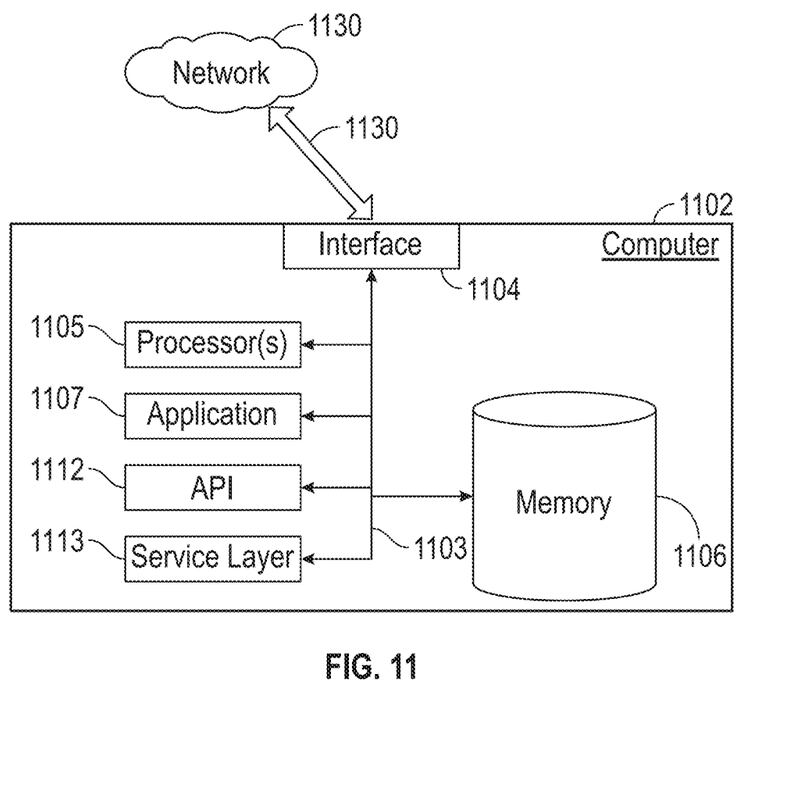
FIG. 11 shows a computer system in accordance with one or more embodiments.

FIG. 11 shows a computer (1102) system in accordance with one or more embodiments. Specifically, FIG. 11 shows a block diagram of a computer (1102) system used to provide computational functionalities associated with described algorithms, methods, functions, processes, flows, and procedures as described in the instant disclosure, according to an implementation. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (1102) may include a computer that includes an input device, such as a keypad, keyboard, touch screen, or other device that can accept user information, and an output device that conveys information associated with the operation of the computer (1102), including digital data, visual, or audio information (104, 106) (or a combination of information), or a GUI.

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130). In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102)) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or other suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a non-transitory computer (1102) readable medium, or a memory (1106), that holds data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), each computer (1102) communicating over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:
1. A method comprising:
cementing a fiber optic cable having a plurality of receiver stations behind a casing string disposed in a wellbore;

connecting an interrogator to a surface-extending portion of the fiber optic cable;
extending the wellbore into a subsurface using a drill bit;
for each of a plurality of depths of the drill bit in the wellbore:
  detecting, at each of the plurality of receiver stations located along the fiber optic cable, a seismic signal created by the drill bit drilling the wellbore;
  creating an optical signal at each of the plurality of receiver stations based on the detection of the seismic signal;
  sending the optical signal to the interrogator using the fiber optic cable;
  generating a summed optical signal for each receiver station by stacking the sorted plurality of optical signals; and
  determining, using the computer processor, a seismic velocity using first breaks picked from the summed optical signals; and
creating a seismic image of the subsurface using the seismic velocity determined for each of the plurality of depths of the drill bit in the wellbore; creating a trajectory of a well in the subsurface using the seismic image; and
drilling the well into the subsurface based on the trajectory of the well.

2. The method of claim 1, further comprising generating a 1D velocity profile from the seismic velocity determined for each of the plurality of depths.

3. The method of claim 2, further comprising generating an uncertainty estimate of the 1D velocity profile based, at least in part, on a statistical analysis of the 1D velocity profile to determine whether to use the 1D velocity profile to create the seismic image.

4. The method of claim 1, wherein each receiver station comprises a gauge length of the fiber optic cable and each gauge length has a center.

5. The method of claim 4, wherein a distance between the centers of two neighboring receiver stations determines a receiver spacing.

6. The method of claim 1, wherein detecting the seismic signal comprises sensing a strain of the fiber optic cable generated by the seismic signal.

7. The method of claim 6, wherein sending the optical signal comprises propagating a backscattered laser beam along the fiber optic cable.

8. The method of claim 1, wherein sorting the optical signals by receiver station comprises arranging the optical signals from the plurality of receiver stations into a common-shot gather.

9. The method of claim 1, wherein sorting the optical signals by receiver station comprises arranging the optical signals from the plurality of receiver stations into a common receiver gather.

10. A drilling system comprising:
a drill string having a drill bit disposable within a cased portion of a wellbore, wherein the cased portion of the wellbore is cased with a casing string and the drill bit is configured to drill an uncased portion of the wellbore below the cased portion, and wherein drilling the uncased portion of the wellbore creates a plurality of seismic signals;
a fiber optic cable having a plurality of receiver stations and cemented behind the casing string, wherein the plurality of receiver stations receive the plurality of seismic signals and create a plurality of optical signals due to reception of the plurality of seismic signals;
an interrogator connected to a surface-extending portion of the fiber optic cable, the interrogator configured to receive the plurality of optical signals from the plurality of receiver stations; and
a computer processor in communication with the interrogator, the computer processor configured to:
  receive the plurality of optical signals from the interrogator;
  sort the plurality of optical signals by each receiver station and by depth of the drill bit;
  generate a summed optical signal for each receiver station and each depth of the drill bit by stacking the sorted plurality of optical signals; and
  determine a plurality of seismic velocities using first breaks picked from the summed optical signals;
  form a seismic image of the subsurface using the plurality of seismic velocities, wherein the seismic image is configured to be used to create a trajectory of a well in the subsurface and drill the well into the subsurface based on the trajectory.

11. The drilling system of claim 10, wherein each receiver station comprises a gauge length of the fiber optic cable and each gauge length has a center.

12. The drilling system of claim 11, wherein a distance between the centers of two neighboring receiver stations determines a receiver spacing.

13. The drilling system of claim 10, wherein each seismic signal comprises a propagation of seismic waves.

14. The drilling system of claim 13, further comprising a strain caused by the propagation of seismic waves when the propagation of seismic waves interacts with the fiber optic cable.

15. The drilling system of claim 14, further comprising a laser streaming within the fiber optic cable.

16. The drilling system of claim 15, wherein each optical signal comprises a backscatter of the laser caused by the strain.

17. The drilling system of claim 10, wherein sorting the plurality of optical signals by each receiver station comprises sorting the plurality of optical signals using a common shot gather sorting domain.

18. The drilling system of claim 10, wherein sorting the plurality of optical signals by each receiver station comprises sorting the plurality of optical signals using a common receiver gather sorting domain.

19. The drilling system of claim 10, wherein the computer processor is further configured to generate a 1D velocity profile from the plurality of seismic velocities and generate an uncertainty estimate of the 1D velocity profile based, at least in part, on a statistical analysis of the 1D velocity profile to determine whether to use the 1D velocity profile to create the seismic image.

* * * * *